Jan. 18, 1949.  G. L. USSELMAN  2,459,556
ANGULAR VELOCITY MODULATION
Filed Oct. 12, 1943  2 Sheets-Sheet 1

INVENTOR.
George L. Usselman
BY
ATTORNEY.

INVENTOR.
George L. Usselman

Patented Jan. 18, 1949

2,459,556

UNITED STATES PATENT OFFICE 2,459,556

ANGULAR VELOCITY MODULATION

George L. Usselman, Port Jefferson, N. Y., assignor to Radio Corporation of America, a corporation of Delaware Application October 12, 1943, Serial No. 505,927

1 Claim. (Cl. 179—171.5)

This application relates to generation of oscillatory energy and timing or angular velocity modulation of the generated energy in accordance with control or modulation potentials.

The general object of my invention is an improved oscillation generation and angular modulation system. A specific object of the present invention is to provide a simplified arrangement for the production of oscillatory energy, angular velocity modulation of the same and accomplishment of the above without causing undesired amplitude modulation of the oscillatory energy in accordance with the control or modulating potentials.

The above objects are attained in accordance with my invention by the use of an electron discharge device having a plurality of control electrodes and at least one anode electrode with the electrodes connected in two oscillation generating circuits including a crystal. The generating circuits which include the crystal as the stabilizing element also include means for relatively shifting the phases of the oscillations generated in the two circuits and feeding the same to a common tank circuit. Differential modulation of two control electrodes or of two anodes, when the two systems include two anodes, modulates the angular velocity of the generated energy fed to the tank circuit.

In most phase modulated oscillation circuits using one tube, one grid or tube element is modulated by the control potential or signal. This results in distorted angular velocity modulation and also produces amplitude modulation. In my system the modulation is differential and substantially linear and is quite free of undesired amplitude modulation.

In my system, oscillations are generated and the angular velocity of the oscillations is modulated by control potentials or signals. The generated oscillations may be modulated as to phase or frequency or in such a manner that the modulation has the characteristics of both phase and frequency modulation. The exact nature of the modulation depends on, among other things, the manner in which the modulation or control potentials are treated before application as modulating or control potentials to the generator tube of my system.

Figure 1:
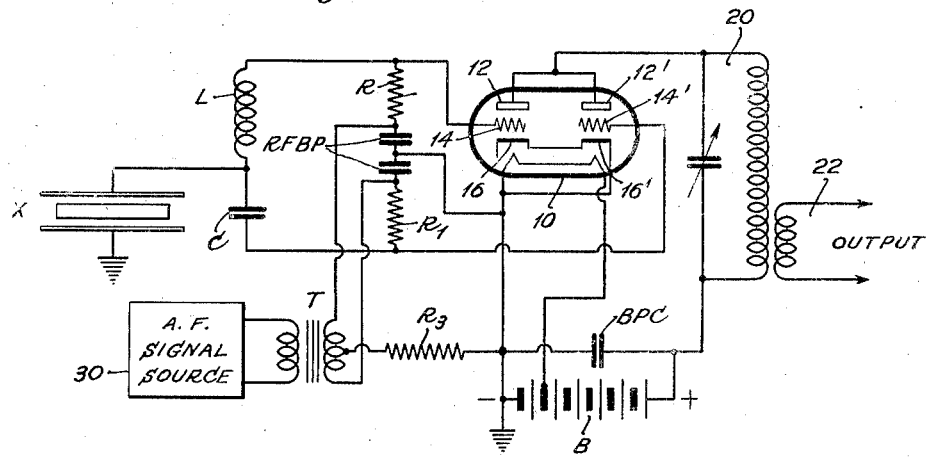

Other objects, the manner in which they are accomplished and the advantages derived from the use thereof, will appear from the following detailed description of the invention and therefrom when read in connection with the attached drawings, wherein Fig. 1 illustrates an embodiment of a modulation system arranged in accordance with my invention.

In Fig. 1, two electron discharge systems in a single envelope are arranged to generate stabilized oscillatory energy and to angularly velocity modulate the generated energy in accordance with control or modulating potentials.

Figure 2:
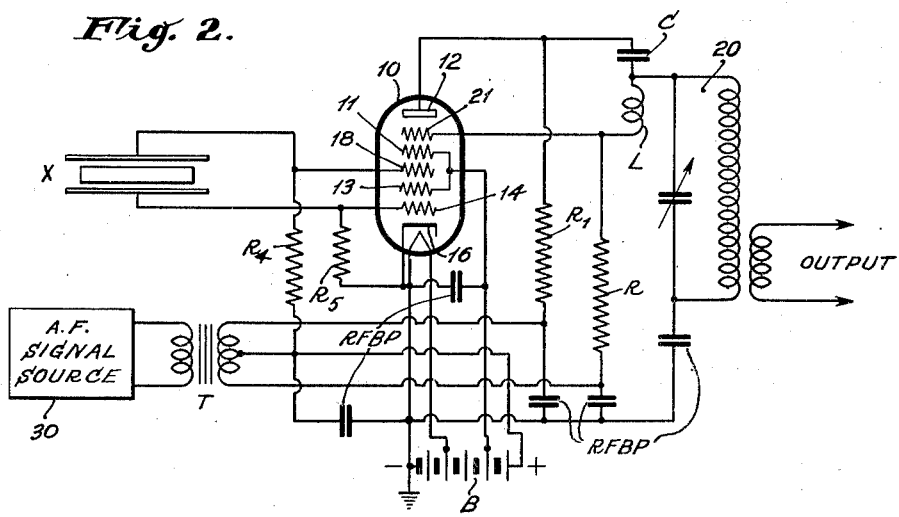

Fig. 2 is a modification of the arrangement of Fig. 1. In Fig. 2 a single electron discharge system having a plurality of control electrodes, an anode and an additional electrode serving as an anode is used.

Figure 3:
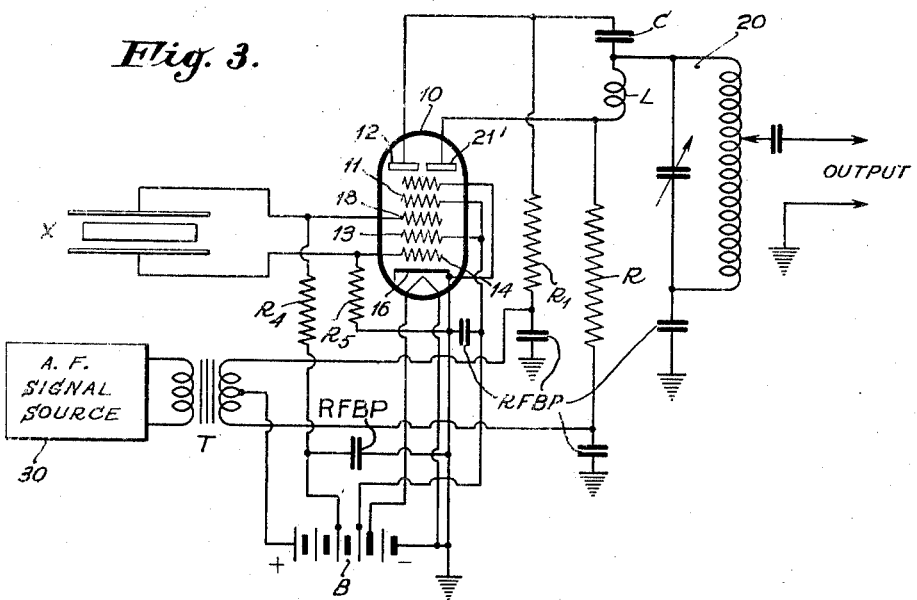
Figure 4:
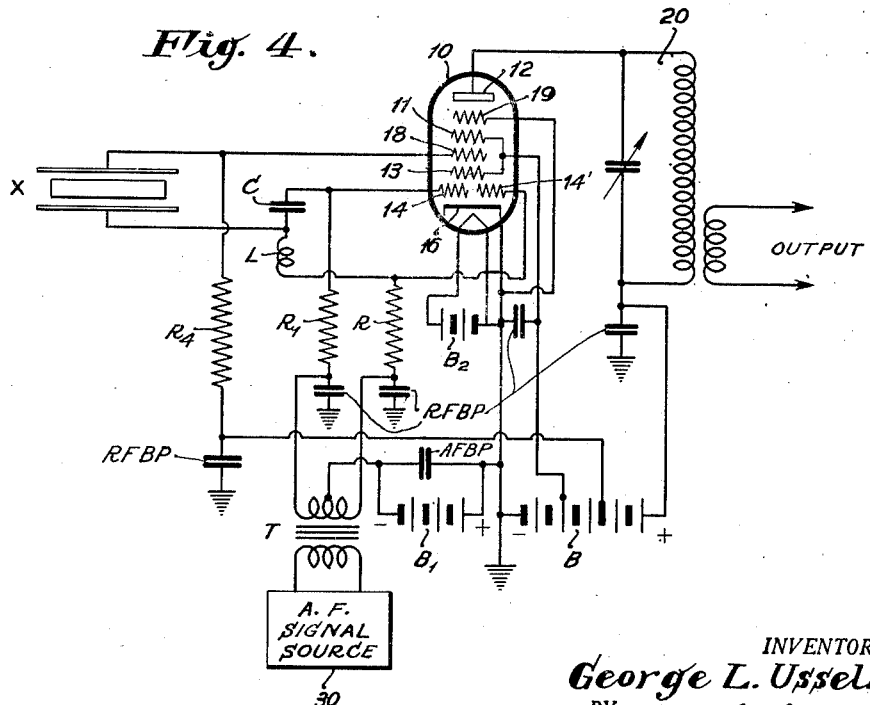

Fig. 3 is a modification of the prior arrangements. In Fig. 3, the discharge system has a plurality of controlling electrodes and a pair of anode electrodes which are differentially modulated in accordance with signals, while, Fig. 4 is a modification of the prior arrangements. The tube in Fig. 4, as in Fig. 1, has twin controlling electrodes equally spaced from the cathode.

In Fig. 1, the tube 10 includes two electron discharge systems, one of which includes an anode 12, control grid 14, and cathode 16, and the other of which includes an anode 12' and control grid 14', and cathode 16'. The anodes are tied together and connected to a tank circuit 20 coupled to an output circuit 22. The control grids 14 and 14' are connected respectively by inductance L and condenser C to an electrode on the crystal X, another electrode of which is connected to ground and to the cathodes.

Control grids 14 and 14' also are coupled differentially through grid biasing resistors R and R1 to the secondary of a transformer T, the primary of which is connected to a control potential source 39 which may be an audio frequency signal source. The source B supplies current for the filaments and potential for the anodes, while the biasing resistors R, R1 and R3 supply the desired negative potentials between the control grids 14, 14' and the cathode.

Oscillations are generated in the tube 10 by virtue of the feedback between the anodes 12 and 12', and the control electrodes 14 and 14'. The generated oscillations are stabilized as to frequency by the crystal X in a well known manner, and considered in the absence of L, C, R and R1, the oscillations generated would be of a frequency determined by the dimensions of X. The generated oscillations appear in the tank circuit, which is tuned substantially to the frequency of the crystal X.

However, in my system crystal excitation of grid 14 is by way of a phase retarding circuit including inductance L and resistance R, which also is the bias resistance, and the resistance and/or capacity within the tube between grid 14 and cathode 16. The excitation path from the crystal X to the grid 14' includes the phase advancing network comprising condenser C, resistance R1 and the resistance and capacity between the control grid 14' and the cathode 16'.

If we consider the two oscillator circuits separately, it is apparent that the oscillations generated in the system including L and R would be of a phase which lags with respect to the phase of the oscillations generated in the system including C and R1. However, the two generating circuits have elements such as the crystal X in common so that the oscillators are entrained to operate at a common frequency and phase intermediate the frequency and phase at which the generators considered separately tend to operate. In the absence of modulating potentials, then, oscillations of a fixed frequency, which can be made the frequency of the crystal, appear in the circuit 20.

However, when the electron discharge systems are differentially modulated, one of the generators supplies more energy to the tank circuit than the other generator and the phase and frequency of the combined energy in the tank circuit swings toward the phase and frequency of the generated oscillation which said one electron system generator would generate if the generators were not entrained.

Since the control grids are differentially modulated and equally spaced from the cathode, undesired amplitude modulation cancels out.

In the modification illustrated in Fig. 2, the tube 10 has an anode 12, a control grid 14, a cathode 16, an auxiliary grid 18 serving as an anode in the oscillation generating circuits, a screening electrode 11, 13, and an additional grid-like electrode 21 serving as an anode in the output circuit.

The crystal X has one electrode connected to the grid 18 which is maintained positive with respect to the cathode by resistance R4 connected to a point intermediate the terminals of the secondary winding T and by a lead from this winding to a plus terminal on the source B. The other electrode of the crystal X is connected to the control grid 14 which is connected to the cathode 16 by grid biasing resistor R5.

The anode 12 and the auxiliary anode grid 21 are connected by phase shifting and charging resistances R1 and R respectively to the terminals of the secondary winding of transformer T and from the connection to the mid-point of said secondary winding to the positive terminal of source B. The resistors R and R1 supply the positive operating potentials to the electrodes 12 and 21 and also function with condenser C and inductance L respectively in phase advancing and phase retarding networks. The tank circuit 20 is coupled by condenser C and by inductance L respectively to the anode 12 and anode-like electrode 21.

Oscillations are generated in the tube by virtue of the coupling of the crystal X between the anode grid 18 and the control grid 14, and by virtue of the fact that the resistance R4 acts as a load impedance for the anode-like electrode 18. The crystal X delivers its excitation energy to grid 14 which is supplied with grid leak negative bias by the rectified grid current passing through resistor R5. The crystal receives its feedback energy, to keep it oscillating, from grid 18 which acts as an anode. Grid 18 is supplied with positive power through impedance or resistor R4. The radio frequency voltages on the grids 14 and 18 are substantially 180° out of phase, this being the best condition for generation of oscillations. The grids 11 and 13 act as screens to shield the anode grid 18 from the other grids to prevent feeding through energy by inter-electrode capacity. The anode-like grid 21 and the anode 12 are electron coupled to the oscillation generating circuits. The two anodes 21 and 12 draw a steady average current through the other tube grids so that the operation of the latter electrodes is not affected. Differential modulation of the potentials on anodes 21 and 12 produces phase modulation in the output circuit 20 but the average D. C. current remains substantially constant. Also, the amplitude of the A. C. oscillations in the output circuit remains substantially constant but the angular velocity of the oscillations changes according to the amplitude and frequency of the signal oscillations.

Since the electrodes 12 and 21 are connected to the tank circuit 20 through phase shifting condenser C and resistance R1 and phase shifting inductance L and resistor R, the energy reaching the tank circuit 20 from one anode is relatively shifted in phase in one direction, while the energy reaching the tank circuit 20 from the other anode is relatively shifted in phase in the opposite direction. If the anodes (in the absence of modulation) supply equal amounts of radio frequency energy to the tank circuit the resultant energy therein will be of a phase intermediate the phases of the energies supplied by each anode.

It is desirable for anodes 12 and 21 to carry equal direct currents and alternating current average currents so that their effect will be the same on the tank circuit 20, during modulation. This condition can be obtained by choosing the correct relative values for resistors R and R1 and possibly adjustment of the mid-tap connection (to one side if necessary) on transformer T.

If one anode supplies more energy to the tank circuit the resultant energy therein will take up a new phase closer to the phase of the energy supplied by said one anode. Differential control of the gains of the anodes correspondingly controls the phase of the generated energy. Anode modulation is used in this case, and when control or modulating oscillations are applied from source 30 through transformer T and resistors R1 and R to the anode 12 and the anode-like grid 21 in phase opposition, the potentials on these electrodes are modulated oppositely in amplitude so that the total amplitude of the carrier energy in tank circuit 20 is constant, but is modulated in phase. This is because the resultant energy fed into the tank circuit 20 is the vector sum of the two phase shifted energies supplied from the two anode electrodes through the phase shifting elements. The two anodes under modulation supply unequal amounts of energy so that the said vector shifts in accordance with the modulation applied.

The phase modulated carrier wave energy delivered at the output of this tube 10, may be supplied to any load such as an antenna or it may be fed through any combination of, or singly through such stages as amplifiers, frequency multipliers or filters before being delivered to the load circuit. To obtain a pure phase modulated output free of amplitude modulation from this modification some adjustment of the phase shifting reactors C and L and resistors R1 and R may be necessary, due to the use of grid 21 as an anode. As stated before, adjustment is such that two anodes supply like amounts of radio frequency energy to the tank in carrier condition, and then during modulation there is no change in the amount of energy supplied to the tank circuit, but there is a change in phase in accordance with the modulation.

The modification illustrated in Fig. 3 is in principle quite similar in arrangement and operation to the modification described in detail above. In Fig. 3, I have used reference numerals corresponding to the reference numerals used in Fig. 2 in so far as possible, so that the description of Fig. 2 applies to a large extent to the arrangement in Fig. 3. In Fig. 3, however, I use a tube 10 having two anodes 12 and 21' spaced equally distant from the cathode 6 and from the electrodes in the electron path to the anodes. These anodes 12 and 21' are connected, as in the prior modification, by phase advancing and phase retarding networks C, R1 and L, R to the tank circuit 20.

In this modification the oscillation generator including crystal X operates as described above in connection with Fig. 2. Moreover, the oscillation generating electrodes are, as in Fig. 2, electronically coupled to the output electrodes and circuit. As in the modification described above, the amplified energies in the tank circuit 20 from anodes 12 and 21' are relatively displaced in phase to set up in the tank circuit energy of a phase intermediate the phases of the energies supplied by the two anodes. Differential anode modulation correspondingly modulates the phase of the resultant energy in the tank circuit. Here again it is desirable for the anodes 12 and 21' to carry equal direct and alternating currents so that their effect will be the same on tank circuit 20, during modulation. As stated above, this condition is attained by choosing the correct relative values of R and R1 and at the tap on the secondary of transformer T.

In Fig. 4, I have shown a preferred embodiment of my invention. In this modification a single multi-grid tube having twin control grids 14 and 14', and a single anode 12 is used. The tube illustrated is shown as having four grids in addition to the twin control grids, but it will be understood that the circuit functions properly using three or less grids in addition to the twin control grids 14 and 14'. In the later case, the shielding is not as good as in the modification illustrated.

This modification has many features in common with the prior modifications and here again I have used, in so far as possible, reference characters corresponding to those used in the prior modifications.

The crystal X is coupled between the grid 18 and the twin grids 14 and 14'. One path includes the relatively phase advancing network C, R1, etc., while the other path includes the relatively phase retarding network L, R, etc. The crystal oscillations are maintained by feedback energy from the grid 18, which in the generator serves as an anode and is connected to the crystal electrode. The battery B, as in the prior modification, supplies positive potential for this oscillator anode electrode through resistance R4, this resistance, as in the prior modifications, also acting as the anode load.

The resistors R and R1, in addition to serving in the phase shifting networks, are connected to the secondary winding of transformer T and by a point on said winding through a modulation bypass condenser to the cathode 16 to supply modulating potentials differentially to the grids 14 and 14'. Grids 14 and 14' obtain their negative bias potentials by passing the rectified grid current through resistors R1 and R to the center tap of transformer T and to the cathode 16. It may be found desirable to reduce the effect of grid leak bias on the modulating potentials by supplying additional negative bias from a source B1 in the lead from the point on the secondary of transformer T to the cathode 16. In the prior modifications the cathode heater supply is shown as being taken from source B. In this modification a separate source B2 is connected to the filament. The grids 11, 13, and 19 are shielding grids having the usual connections, as shown.

Assume that the crystal is oscillating, as it will do when proper potentials are applied to the circuit. Carrier frequency oscillating energy is supplied by the crystal oscillator to control grid 14 through phase shifting elements C—R1 which relatively advance the phase of the electrical oscillating carrier energy reaching grid 14. Also, electrical oscillating energy is supplied by the crystal oscillator to control grid 14' through phase shifting elements L—R which relatively retard or turn backwards, the phase of the carrier oscillations reaching grid 14'.

When the amplitude of the bias voltage of grids 14 and 14' is modulated in phase opposition by the signal oscillations from source 30 through transformer T, the phase of the carrier energy supplied to tank circuit 20 through anode 12 by electron coupling in tube 10 is modulated in phase, but the amplitude of this carrier energy remains substantially constant. This is because the anode current is the resultant of two streams of electrons; one stream is controlled by grid 14 and the other is controlled by grid 14'. As stated before, these two grids are excited from the crystal oscillator with a fixed phase difference as determined by the aforementioned phase shifting elements. Now when, during the process of signal modulation, one control grid is biased less negative by a certain amount and the other control grid is biased more negative by the same amount, the total electron current flow is substantially unchanged, whereas the individual streams of electron current controlled by each of grids 14 and 14' assume a phase relation and an amplitude as controlled by these grids. Consequently, the vector addition of these two components gives a sum or resultant which in this case is substantially constant in amplitude but varying in phase. The amount of phase swing or deviation is proportional to the signal amplitude and the frequency of the phase swing is the same as the signal frequency. Of course, these variations in anode current are converted into oscillations, in tank circuit 20, which have the same characteristics in regard to phase and amplitude of the total energy.

I claim:

In an oscillation generating and angular velocity modulating system, an electron discharge device having electrodes including a plurality of grids, one of which serves as an anode, an anode, shielding electrodes interposed between said anode and grids, and a cathode, a piezoelectric crystal in a holder having two terminals, phase shifting networks coupling one of the crystal terminals to two of the control grids, a coupling between the other crystal terminal and said grid serving as an anode, resistive connections between said grids and the cathode of said device for supplying operating potentials to said grids to generate oscillations in said device and couplings, a tank circuit connected with the anode of said device, said tank circuit and anode being coupled to said oscillation generating couplings by the electron stream in said device, and connections for differentially modulating corresponding electrodes in said device in accordance with signals.

GEORGE L. USSELMAN.

REFERENCES CITED

The following references are of record in the file of this patent:

UNITED STATES PATENTS

| Number | Name | Date |
|---|---|---|
| 2,111,587 | Goldstine | Mar. 22, 1938 |
| 2,111,603 | Usselman | Mar. 22, 1938 |
| 2,183,905 | Dull | Dec. 19, 1939 |
| 2,210,015 | Usselman | Aug. 6, 1940 |
| 2,231,854 | Percival | Feb. 11, 1941 |
| 2,309,083 | Usselman | Jan. 26, 1943 |